United States Patent

Notarius

[15] 3,649,309
[45] Mar. 14, 1972

[54] DARK FORSTERITE CERAMIC COMPOSITION
[72] Inventor: Harold Notarius, Livingston, N.J.
[73] Assignee: RCA Corporation
[22] Filed: Sept. 16, 1970
[21] Appl. No.: 72,823

[52] U.S. Cl. ..............................106/39 R, 106/46, 106/58, 106/302
[51] Int. Cl. ..................................C04b 33/00, C04b 33/26
[58] Field of Search ..................106/39 R, 46, 45, 48, 58, 62, 106/68, 302, 314; 264/61

[56] References Cited

UNITED STATES PATENTS 3,020,619   2/1962   Koch....................................106/62 X
3,037,874   6/1962   Garvey................................106/39 R

OTHER PUBLICATIONS

Singer, F., et al.; Industrial Ceramics: New York, 1963 pp. 642– 643 (Table 160)
Norton, F. H.; Elements of Ceramics: Cambridge, Mass., 1952, p. 199

Primary Examiner—James E. Poer
Assistant Examiner—W. R. Satterfield
Attorney—Glenn H. Bruestle

[57] ABSTRACT

The composition comprises a primary phase of forsterite ceramic to which chromic oxide and cobaltic oxide are added in substantially equal amounts to darken the composition while not significantly changing the physical properties thereof.

2 Claims, No Drawings

DARK FORSTERITE CERAMIC COMPOSITION

BACKGROUND OF THE INVENTION

This invention relates to ceramic compositions.

A need exists for an inexpensive, easily fabricated ceramic material which is black, is strong, and which can be provided with a strongly adherent layer of metal to which other bodies can be brazed. In one use of such ceramic material, for example, the ceramic is used as a substrate in a filamentary display device, a plurality of pins being brazed to the substrate, and electrical resistance filaments being mounted between pairs of the pins. To provide good optical contrast for the images being displayed, the substrate is preferably as black as possible.

Heretofore, a ceramic material fully satisfying all these requirements has not been available.

DESCRIPTION OF PREFERRED EMBODIMENTS OF THE INVENTION

The ceramic compositions, according to the instant invention, comprise a mixture of a forsterite ceramic plus additives of chromic oxide and cobaltic oxide.

By "forsterite ceramic" is meant a material having a primary forsterite ($2MgO \cdot SiO_2$) crystalline phase even though secondary phase materials are present. A discussion of the composition of forsterite materials is presented in a paper entitled Quench Firing of Ceramics for Electron-Tube Applications, by Berry, et al., Proceedings of Seventh National Conference on Tube Techniques, Sept. 1964, Publication No. ST-2712.

As noted in this paper, commercially available forsterite ceramics are quite complex, being made from mixtures of such minerals as magnesium oxide, talc, clay, feldspar, and other ingredients. That is, any number of different forsterite ceramic compositions are possible, the particular ingredients used being determined by the physical properties, e.g., the strength, fusion temperature, melting temperature, and expansion characteristics desired of the material. When used in small amounts, e.g., less than 13 percent of the total, the additive materials of the instant invention can be used in any of the various forsterite ceramic compositions, as above defined.

The instant invention is described in connection with the use of a forsterite ceramic described in U.S. Pat. Nos. 3,020,619, issued to W. G. Koch on Feb. 13, 1962, and 3,037,874, issued to L. P. Garvey, on June 5, 1962.

In general, the forsterite ceramic compositions according to the instant invention are prepared by adding powders of the additive materials to known mixtures of materials which are blended into known forsterite compositions. For example, with reference to the process disclosed in the above-cited Garvey patent, commercially available powders of chromic oxide ($Cr_2O_3$) and cobaltic oxide ($Co_2O_3$), sufficiently fine to pass through a 325-Mesh screen, are added to the mixture described in the Garvey patent containing magnesium oxide, Montana talc, Clinchfield feldspar, New Kentucky special ball clay, and barium carbonate, which is thereafter blended by ball milling to provide a "slip", i.e., a suspension of solid powder in a liquid medium. This slip is further processed, as described in the Garvey patent, to provide the ceramic compositions according to the instant invention.

The invention compositions are dark, in comparison to the white compositions provided according to the Garvey patent. For convenience of description, forsterite ceramic compositions made according to prior art processes are referred to hereinafter as "white" ceramics, while ceramic compositions made according to the instant invention are referred to as "dark" ceramics.

To obtain ceramic compositions which are as close to black as possible, the additive materials of the instant invention are preferably added in substantially equal amounts, by weight. Thus, for example, if the amount of cobaltic oxide exceeds the amount of chromic oxide, the color of the resulting composition tends towards a bluish color, the amount of blueness or variation from a black color increasing with the excess of cobaltic oxide. Conversely, if the amount of chromic oxide exceeds the amount of cobaltic oxide, the color of the resulting composition tends towards a greenish color.

Additionally, a minimum amount of the two additive materials, e.g., in excess of 3.5 percent of each material, by weight, should be present in the composition to provide significant coloring thereof.

With increasing amounts above 3.5 percent of each additive material, the effect of the additive materials on the color of the composition rapidly increases. Above 6 percent of each additive material, however, little further blackening occurs. Since cobaltic oxide is relatively expensive, in comparison with the other ingredients of the ceramic compositions, amounts of cobaltic oxide in excess of 6 percent are generally not used.

A further advantage of using the additive materials in approximately equal amounts, and in comparatively small quantities, e.g., the amount of the two additives together not being in excess of 13 percent of the total, is that the physical properties of the resulting dark composition are quite similar to the properties of the white forsterite compositions to which the additive materials are combined. This occurs because the use of cobaltic oxide, by itself, tends to lower the melting temperature and sintering temperature of the ceramic, while increasing the coefficient of thermal expansion thereof. Conversely, chromic oxide, by itself, tends to raise the melting and sintering temperatures of the ceramic, while reducing the coefficient of thermal expansion thereof. Thus, the effects of each of the additive materials tend to cancel each other when the two materials are used.

The advantage of the similarity of the physical characteristics of the dark composition with those of the white composition to which the additive materials of the instant invention are blended relates to the fact that various forsterite compositions are often tailor-made, by means of the use of various known ingredients, to have special physical properties best suited for the particular applications to which the compositions are to be used, such "tailoring" often requiring extensive developmental efforts and special fabrication procedures. Thus, being able to provide darkening of such compositions, while not substantially changing either the physical properties or the fabrication thereof, as herein described, is greatly to be desired.

For example, the white forsterite composition described in the Garvey patent has the desired properties of low and uniform shrinkage of dimensions during firing, this allowing greater control of the dimensions of the finished product. The use of the additive materials of the instant invention, in the manner described, does not adversely affect these characteristics.

By way of specific example, to the mixture described in column 2 of the Garvey patent containing 3,300 grams of ingredients, i.e., 894 grams magnesium oxide, 1,692 grams Montana 486 talc, 258 grams P–256 Clinchfield feldspar, 156 grams New Kentucky special ball clay, and 300 grams barium carbonate, is added 165 grams of cobaltic oxide and 165 grams of chromic oxide.

The resulting forsterite composition, fired, for example, as described in the aforementioned patent to Koch, is of a dark blue-green color closely approaching pure black in appearance. The composition of the material, determined by X-ray analysis, according to a process described in an article entitled, Determination of Major and Minor Constituents in Ceramic Materials by X-ray Spectrometry, Analytical Chemistry, vol. 34, p. 1,263 (1962), comprises, by weight approximately 42 percent magnesium oxide, 36.7 percent silicon dioxide (the primary phase ingredients), 6.4 percent barium oxide, 3.7 percent aluminum oxide, 0.9 percent potassium oxide, 0.5 percent iron oxide, 0.4 percent calcium oxide, 0.1 percent titanium dioxide (known ingredients to "tailor" certain characteristics of the composition), 4.6 percent chromic oxide, 4.6 percent cobaltic oxide (the additives of the instant invention), and trace impurities.

While, as above noted, the physical properties of the dark forsterite composition are quite similar to the white ceramic composition to which the additive materials are added, it is found that the dark ceramic composition appears to be somewhat stronger than the white composition.

For example, in one use of the ceramic material described in the Garvey patent, as a substrate having leads brazed therethrough, rather critical limits exist for the amount of mismatch allowable between the diameter of the leads and the size of the holes through the substrate in which the leads are brazed. Thus, using molybdenum leads and a copper braze material, the substrate holes must be within 16.9 and 16.7 mils in diameter, and the leads must be within 15.4 and 15.7 mils in diameter in order to avoid cracking of the ceramic.

With the dark ceramic made in accordance with the instant invention, a far greater mismatch of the leads and holes is found possible. Thus, with leads of 15½ mils diameter it is found that the use of substrate holes having a diameter as great as 25 mils does not cause cracking of the substrate upon the brazing of the leads to the substrate.

The dark forsterite ceramics of the instant invention can be metallized with strongly adherent layers of metal, e.g., molybedenum or tungsten, using known techniques, such as those described in U.S. Pat. No. 3,215,555, issued to R. A. Krey on Nov. 2, 1965.

I claim:

1. A substantially black ceramic composition consisting essentially of a primary forsterite crystalline phase plus additives of cobaltic oxide and chromic oxide, said additives being present in approximately equal amounts and comprising in excess of about 7 percent, and less than about 13 percent by weight, of said composition.

2. A ceramic composition according to claim 1 comprising 4.6 percent cobaltic oxide and 4.6 percent chromic oxide.

* * * * *